H. H. BLACHE.
REVERSING GEAR FOR FOUR-CYCLE INTERNAL COMBUSTION ENGINES.
APPLICATION FILED OCT. 6, 1915.

Inventor
Hans Henrik Blache

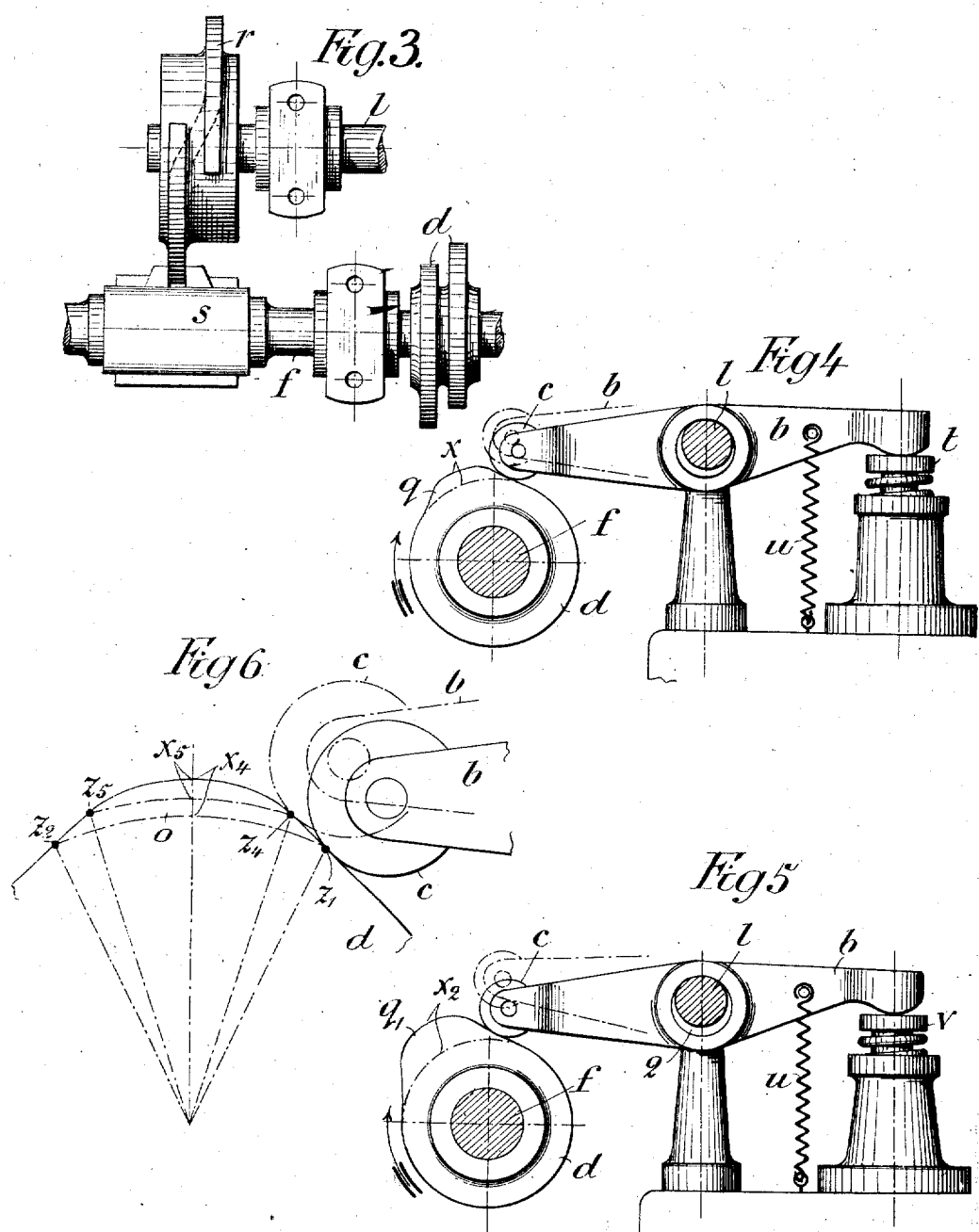

UNITED STATES PATENT OFFICE.

HANS HENRIK BLACHE, OF COPENHAGEN, DENMARK.

REVERSING-GEAR FOR FOUR-CYCLE INTERNAL-COMBUSTION ENGINES.

1,258,178.  Specification of Letters Patent.  Patented Mar. 5, 1918.

Application filed October 6, 1915. Serial No. 54,364.

*To all whom it may concern:*

Be it known that I, HANS HENRIK BLACHE, engineer, subject of the Kingdom of Denmark, residing at No. 20 St. Jakobsgade, Copenhagen, Denmark, have invented certain new and useful Improvements in Reversing-Gears for Four-Cycle Internal-Combustion Engines, of which the following is a specification.

This invention has for its object improved reversing gear for four-cycle internal combustion engines having a longitudinally movable cam shaft carrying two sets of cams, which are caused to operate the valve controlling rollers alternatively for the different directions of running, by moving the cam shaft longitudinally.

Such reversing gear includes means for lifting the valve controlling rollers from the cams, means for moving the cam shaft lengthwise when the rollers are lifted, so that the cams corresponding to the opposite direction of rotation are brought beneath the rollers, and means for again bringing the rollers into contact with the cams.

The invention has especially for its object to simplify the reversing gear by reducing the necessary parts or elements as much as possible, thereby also reducing the weight of said gear, and to construct the device in such a manner that all the movements necessary for the reversal are performed by the rotation of a single handwheel or device.

To this end the two-armed levers which carry the valve controlling rollers, turn about disks or members eccentrically fixed to a common reversing or operating shaft, which can be rotated by means of a handwheel or the like, so that all the controlling rollers are lifted from and again brought into contact with the cams for each full revolution of the operating shaft. Said shaft further carries a curved disk or device engaging a grooved disk or the like fixed to the cam shaft. The said curved disk or device has such a shape that during the first part of the revolution of the operating or reversing shaft, during which the controlling rollers are lifted from the cams, it maintains the cam shaft in position. During the further revolution of the operating shaft the curved disk or device moves the cam shaft lengthwise to such an extent that the cams corresponding to the opposite direction of rotation are brought beneath the controlling rollers, and it thereafter maintains the cam shaft in its new position during the last portion of the revolution of the operating shaft, which again brings the rollers in contact with the cams.

The cam shaft is rotated from the crank shaft of the engine by means of helical gear wheels having such a shape that they permit of the longitudinal movement of the cam shaft in the teeth of the helical gear wheels.

The improved reversing gear further enables the opening of the fuel supply valve, when the gear is in position near its extreme position, to take place at a later moment of time, and the lift of said valve to become less than when the gear is in its extreme position. This is of great importance as thereby the working of the engine is essentially improved and further the consumption of air for the injection of fuel is reduced.

In the accompanying drawing, Figure 1 illustrates by way of example a constructional form of the invention applied to a six cylinder engine.

Fig. 3 is an enlarged detail view, showing the curved, reversing disk, its associated grooved disk and one of the pairs of cams.

Figs. 4 and 5 are enlarged detail views of the devices for controlling the fuel valve and the supply and escape valves, respectively.

Fig. 6 is a diagrammatic view, showing the manner in which the opening of the fuel valve is retarded, and the lift of said valve is reduced, when the engine is running at slow speed.

$a$ designates each cylinder of the motor, $b$ the two-armed levers which control the valves. One end of said levers carries the controlling roller $c$ operated by the cam $d$ fixed to the longitudinally movable cam shaft $f$. For each controlling roller $c$ two cams are provided, arranged side by side.

According as the cam shaft is moved to one side or the other, the controlling rollers are operated by one set of cams or by the other, corresponding to the forward or backward rotation of the engine.

The cam shaft $f$ is rotated from a shaft $g$ by means of a helical gear wheel $h$ fixed to said shaft and engaging a helical gear wheel $i$ fixed to the cam shaft. The teeth of the helical gear wheels have such a shape that they permit of the lengthwise movement of the cam shaft in the teeth themselves.

The levers $b$ turn about eccentric disks 2 which are all fixed to the operating shaft $l$. This shaft carries a curved disk $r$ (shown in Fig. 2) which engages a grooved disk $s$ fixed to the cam shaft.

The controlling device of the fuel-valve is illustrated on a larger scale in Fig. 4. The valve lever $b$ is continually pressed by means of a spring $u$ against the valve spindle $t$, and its roller $c$ when the valve is closed, is in contact with the cylindrical part of the cam $d$. When the motor is running, the cam shaft $f$ revolves, and as the projection $q$ of the cam comes beneath the roller $c$ it is lifted a distance $x$ for opening the valve.

The controlling device of the supply and escape-valves (Fig. 5) is similar to the controlling device of the fuel-valve. During the rotation of the cam shaft $f$ the roller $c$ of the valve lever $b$ is lifted a distance $x^2$ by the projection $q'$ of the cam $d$ so that the lever is turned and presses down the valve spindle $v$ whereby the valve is opened.

Figure 1:
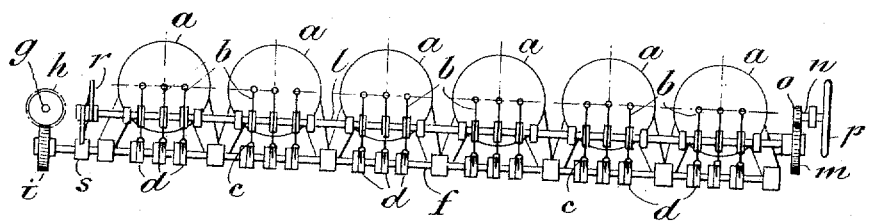

The described reversing gear operates in the following manner:

When the motor is set to run full speed forward or backward the lever shaft $l$ is in a position such that the centers of the eccentric disks 2 lie in a vertical plane through the axis of the shaft. When the motor is to be reversed the lever shaft $l$ is by means of the hand wheel $p$ and the pinions $o$ (Fig. 1) turned a full revolution. During the first part of said revolution the eccentric disks 2 lift the valve levers $b$ so that their rollers $c$ come into the positions shown in dotted lines in Figs. 4 and 5, in which positions they are free of the cams $d$. Simultaneously the curved disk $r$ is turned a sufficient distance without changing the position of the shaft $f$. During the following part of the revolution the curved disk $r$ is turned causing the grooved disk $s$ to be lengthwise displaced and the cam shaft brought in its right extreme position, in which the cams for reverse running are beneath the valve levers. During the last part of the full revolution of the shaft $l$ the curved disk $r$ is turned without influencing the position of the cam shaft, but the valve levers are returned to the position shown in full lines in Figs. 4 and 5, so that their rollers $c$ can be actuated by the reverse cams.

When the motor is again run in a forward direction, the valve lever shaft $l$ is turned a full revolution in the opposite direction, whereby the above described movements are repeated in the opposite order.

For slow speed the valve lever shaft $l$ is not turned a full revolution, so that the curved disk $r$ is stopped near either terminal thereof. The lengthwise displacement of the cam shaft $f$ is not influenced as said displacement is performed only by the curved part or central portion of the disk $r$. The incomplete revolution does not cause the centers of the eccentric disks 2 to lie in a vertical plane through the axis of the shaft, and consequently the distance between the rollers $c$ of the levers and the cams is greater. This is illustrated in Fig. 6. When the motor is set for full speed, the valve levers $b$ and their rollers $c$ are in the position shown in full lines, so that the corresponding valves are opened, when the rollers $c$ come in contact with the cams $d$ at the point $z'$, and closed again at the point $z^2$, and the total lift is $x^4$. When the reversing gear however as above mentioned is set for slow speed near one of its extreme positions the valve levers $b$ and their rollers $c$ are in the position shown in broken lines in Fig. 6, so that the opening of the valves first commences at the point $z^4$ and their closing is performed at the point $z^5$ whereby their lift is reduced to the distance of $x^5$. Of course the opening of the valves is retarded, their closing advanced and their lift reduced as compared with the valve-movements during full speed, when the reversing gear is in either of its extreme positions. As the projection $q$ (Fig. 4) of the cam of the fuel-valve is essentially lower than the projection $q'$ of the cams of the supply and escape-valves (Fig. 5), a small augmentation of the distance between the roller of the lever of the fuel-valve and its cam will of course vary essentially the lift of the fuel-valve, while at the same time, the variation of the lift of the supply- and the escape-valves is very slight. The described setting of the reversing gear in a position near its extreme positions will of course generally only influence the fuel-valve. This is very important as during slow speed the fuel valve can be easily and surely set to open at a later and close at an earlier time and to have a smaller lift during full speed.

Figure 2:
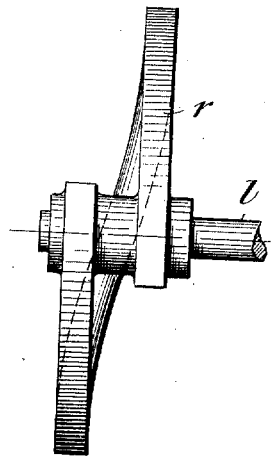
Fig. 2 shows a detail in a larger scale.

It is to be observed, with reference to the curved rib or cam on the periphery of the disk $r$, that the same comprises two straight end portions disposed in spaced, parallel relation with their terminals overlapping and an inclined or diagonal central portion connecting them, as clearly shown in Figs. 2 and 3, this connecting portion being the only part of the rib or cam having an inclined arrangement. Because of this peculiar construction, it is possible to utilize one and the same shaft both for the displacement of the cam levers relative to the cams, and for the endwise shifting of the cam shaft, since the straight end portions of the cam rib are long enough to remain in engagement with the grooved disk during that portion of the revolution of the lever shaft during which the levers are removed from the cams.

I am aware that the lengthwise movable cam shaft carrying two sets of cams alternatively operating the two-armed valve controlling levers, and the eccentric mounting of said levers is known, and of course I do not claim such arrangement.

Having now particularly described and ascertained the nature of my said invention, and in what manner the same is to be performed, I declare that what I claim is:

1. In reversing gears, the combination of a longitudinally movable cam shaft; a valve lever shaft; a plurality of valve levers eccentrically mounted on the lever shaft; a plurality of pairs of cams, one pair for each lever, mounted on the lever shaft; a disk mounted on said lever shaft and provided with a peripheral spiral cam rib comprising a pair of straight end portions arranged in spaced, parallel relation with their terminals overlapping, and a single inclined central portion connecting them; and a disk mounted on the cam shaft and provided with a groove wherein said cam rib is engaged.

2. In reversing gears, the combination of a longitudinally movable cam shaft; a valve lever shaft; a plurality of valve levers eccentrically mounted on the lever shaft; a plurality of pairs of cams, one pair for each lever, mounted on the lever shaft, the eccentric mounting of said levers causing them to be removed from said cams during a portion of the revolution of the lever shaft; a disk mounted on said lever shaft and provided with a peripheral spiral cam rib comprising a pair of straight end portions arranged in spaced, parallel relation with their terminals overlapping, and a single inclined central portion connecting them; and a disk mounted on the cam shaft and provided with a groove wherein said cam rib is engaged; the said end portions of the cam rib being long enough to remain in engagement with said groove during the aforesaid portion of the revolution of the lever shaft.

In testimony whereof I have affixed my signature in presence of two witnesses.

HANS HENRIK BLACHE.

Witnesses:
 MARCUS MOELLER,
 T. EBERLE.